US012628075B2

(12) United States Patent
Lall et al.

(10) Patent No.: US 12,628,075 B2
(45) Date of Patent: May 12, 2026

(54) SYSTEM FOR FACILITATING MULTI-LEVEL STREAM-BASED EDGE ANALYTICS IN MULTI MODAL COMMUNICATION AND METHOD THEREOF

(71) Applicant: INDIAN INSTITUTE OF TECHNOLOGY DELHI, New Delhi (IN)

(72) Inventors: Brejesh Lall, New Delhi (IN); Arzad Alam Kherani, New Delhi (IN); Ashish Singh Patel, New Delhi (IN); Gaurav Shukla, New Delhi (IN)

(73) Assignee: INDIAN INSTITUTE OF TECHNOLOGY DELHI, New Delhi (IN)

( * ) Notice: Subject to any disclaimer, the term of this patent is extended or adjusted under 35 U.S.C. 154(b) by 341 days.

(21) Appl. No.: 18/455,715

(22) Filed: Aug. 25, 2023

(65) Prior Publication Data

US 2024/0365219 A1 Oct. 31, 2024

(51) Int. Cl.
| | |
|---|---|
| *H04W 48/18* | (2009.01) |
| *H04L 41/147* | (2022.01) |
| *H04L 67/12* | (2022.01) |

(52) U.S. Cl.
CPC ........... *H04W 48/18* (2013.01); *H04L 41/147* (2013.01); *H04L 67/12* (2013.01)

(58) Field of Classification Search
CPC ....... H04W 48/18; H04L 41/147; H04L 67/12
USPC ......................................................... 370/329
See application file for complete search history.

(56) References Cited

U.S. PATENT DOCUMENTS

| | | | |
|---|---|---|---|
| 11,159,628 B1 | 10/2021 | Gupta et al. | |
| 2024/0380848 A1* | 11/2024 | Wang | H04M 15/66 |
| 2024/0388884 A1* | 11/2024 | Hu | H04W 8/065 |
| 2025/0047737 A1* | 2/2025 | Gupta | H04L 67/51 |
| 2025/0175883 A1* | 5/2025 | Cogalan | H04W 48/18 |

FOREIGN PATENT DOCUMENTS

WO        2020209951 A1    10/2020

* cited by examiner

*Primary Examiner* — Christopher B Robinson
*Assistant Examiner* — Chong G Kim
(74) *Attorney, Agent, or Firm* — Ohlandt, Greeley and Perle, LLP.

(57) ABSTRACT

A device, system and method for facilitating multi-level stream-based edge analytics in multi-modal communication. The device generates at least one primary data stream and secondary data stream by processing a plurality of data streams received from one or more data sources based on type of a multimodal application. Further, the device determines bandwidth requirements for transmission of the primary data stream and secondary data stream. The device then selects one or more network interfaces from a plurality of network interfaces to transmit at least one primary data stream based on traffic characteristics of the plurality of network interfaces and the bandwidth requirements. The device then transmits the primary data stream to an edge analytic server for edge analytics via the selected one or more network interfaces.

11 Claims, 5 Drawing Sheets

400

300

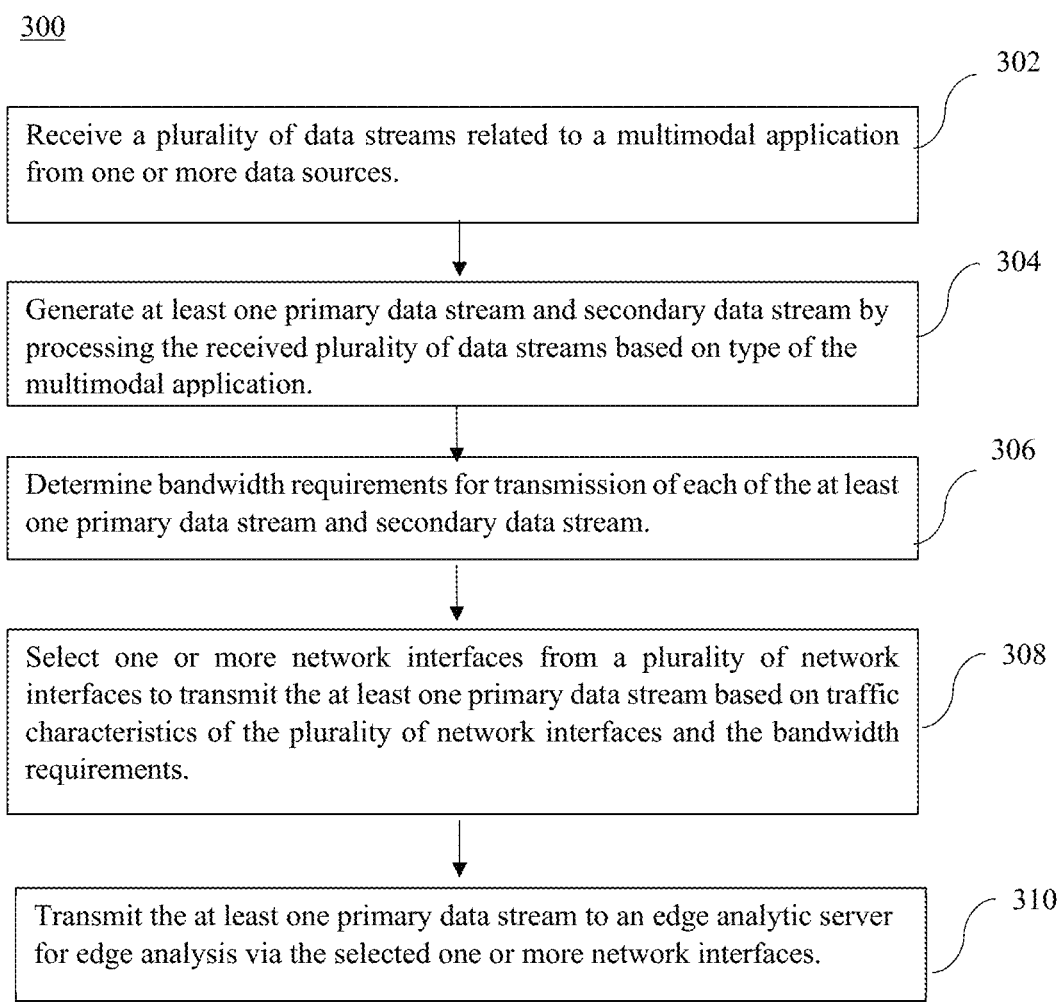

302

Receive a plurality of data streams related to a multimodal application from one or more data sources.

304

Generate at least one primary data stream and secondary data stream by processing the received plurality of data streams based on type of the multimodal application.

306

Determine bandwidth requirements for transmission of each of the at least one primary data stream and secondary data stream.

308

Select one or more network interfaces from a plurality of network interfaces to transmit the at least one primary data stream based on traffic characteristics of the plurality of network interfaces and the bandwidth requirements.

310

Transmit the at least one primary data stream to an edge analytic server for edge analysis via the selected one or more network interfaces.

SYSTEM FOR FACILITATING MULTI-LEVEL STREAM-BASED EDGE ANALYTICS IN MULTI MODAL COMMUNICATION AND METHOD THEREOF

CROSS-REFERENCED APPLICATION

This application claims priority to Indian patent application No. 202311030248, filed on Apr. 27, 2023, which is incorporated herein in its entirety by reference thereto.

FIELD OF TECHNOLOGY

The present disclosure relates to an edge computing technique in a wireless communication system. In particular, the present disclosure relates to a system and method for facilitating multi-level stream-based edge analytics in a multi-modal communication network.

BACKGROUND

Edge Computing technology brings data processing closer to the site of data collection, thereby greatly improving the response times and efficient utilization of network resources. However, with the advent of 5G communication, there has been a drastic increase in the amount of data consumed by various end-user devices that affect the performance of edge computing devices.

Further, user applications may require different types of real-time data for analysis and processing. These data types, including audio, video, tactile, sensory, kinesthetic, haptics etc. are typically referred as multi-modal data, which is collected from multiple data sources. One such user application that collates multi-modal data from different sources is the tactile application. Tactile applications are currently being used in various use cases such as augmented reality, healthcare, gaming and education.

To meet the growing technology needs of users, different techniques such as edge computing and 5G communications are merged to provide a seamless experience. However, the current 5G communication standards impose stringent Quality of Service (QoS) and Quality of Experience (QoE) requirements on the user applications to yield end-to-end latency, reliability, security, and high availability. However, multi-modal applications present a significant challenge in conforming to these requirements due to the large amount of data being transmitted.

In view of the above limitations, there arises a need for an edge analytics system that meets the current technology needs for a multi-modal application.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the disclosure.

In one embodiment, a client device for facilitating multi-level stream-based edge analytics in multi-modal communication is disclosed. The client device comprises a memory and an I/O interface communicatively coupled with the memory. The client device further comprises a processing unit communicatively coupled with the memory and the I/O interface. Herein, the processing unit is configured to receive a plurality of data streams related to a multimodal application from one or more data sources via the I/O interface. The processing unit further generates at least one primary data stream and secondary data stream by processing the received plurality of data streams based on type of the multimodal application. Herein, the primary data stream is sufficient to perform the edge analytics at an edge analytic server and the secondary data stream provides additional information to enhance the edge analytics at the edge analytic server. The processing unit is configured to determine bandwidth requirements for transmission of each of the at least one primary data stream and secondary data stream; and select one or more network interfaces from a plurality of network interfaces to transmit at least one primary data stream based on traffic characteristics of the plurality of network interfaces and the bandwidth requirements. Further, the processing unit transmits at least one primary data stream to the edge analytic server for the edge analytics via the selected one or more network interfaces.

In another embodiment, the processing unit is configured to further transmit the at least one secondary data stream to the edge analytic server for advanced edge analytics based on aggregation of at least one primary data stream and secondary data stream.

In another embodiment, the plurality of data streams comprises at least one of a video data stream, audio data stream, and haptic data stream.

In yet another embodiment, one or more data sources comprises one or more of a camera, a microphone, a temperature sensor, and an actuator.

In another embodiment, the type of multimodal application comprises at least one of: remote care, remote detonation, remote operation, remote maintenance, and remote firefighting. Further, the primary data stream and secondary data stream are generated by processing the received plurality of data streams based on input requirements of the edge analytic server to perform the edge analytics based on the type of the multimodal application.

In another embodiment, the primary data stream comprises one or more of: low-resolution video data stream, medium resolution video data stream, high-resolution video data stream, low sample rate audio data stream, medium sample audio data stream, high sample rate audio data stream and haptic data stream.

In another embodiment, a method of facilitating multi-level stream-based edge analytics in multi-modal communication is disclosed. The method comprising receiving a plurality of data streams related to a multimodal application from one or more data sources and generating at least one primary data stream and secondary data stream by processing the received plurality of data streams based on type of the multimodal application. Herein the primary data stream is sufficient to perform the edge analytics at an edge analytic server and the secondary data stream provides additional information to enhance the edge analytics at the edge analytic server. Further, the method comprises determining bandwidth requirements for transmission of each of at least one primary data stream and secondary data stream. The method further comprises selecting one or more network interfaces from a plurality of network interfaces to transmit the at least one primary data stream based on traffic characteristics of the plurality of network interfaces and the bandwidth requirements. Later the method comprises transmitting at least one primary data stream to an edge analytic server for the edge analytics via the selected one or more network interfaces.

In yet another embodiment, a system for multi-level stream-based edge analytics in multi-modal communication is disclosed. The system comprises an edge analytic server and a client device. The client device is configured to communicate with the edge analytic server, via one or more network interfaces. Further, the client device comprises a memory and an I/O interface communicatively coupled with the memory. Further, the client device comprises a processing unit communicatively coupled with the memory and the I/O interface. Herein the processing unit is configured to receive a plurality of data streams related to a multimodal application from one or more data sources via the I/O interface and generate at least one primary data stream and secondary data stream by processing the received plurality of data streams based on type of the multimodal application. Herein the primary data stream is sufficient to perform the edge analytics at the edge analytic server and the secondary data stream provides additional information to enhance the edge analytics at the edge analytic server. The processing unit further determines bandwidth requirements for transmission of each of the at least one primary data stream and secondary data stream. The processing unit selects one or more network interfaces from a plurality of network interfaces to transmit the at least one primary data stream based on traffic characteristics of the plurality of network interfaces (115a . . . n) and the bandwidth requirements. Further, the processing unit transmits at least one primary data stream to the edge analytic server for the edge analytics via the selected one or more network interfaces. Furthermore, the edge analytic server is configured to receive at least one primary data stream from the client device and perform the edge analytics on the received at least one primary data stream.

One object of the invention is to provide a system that efficiently utilizes network resources while also improving edge analytic capabilities for multi-modal communication. The present invention aims to reduce the network overhead thereby improving network performance.

Another objective of the invention is to achieve end-to-end latency, high availability and reliability requirements for tactile applications.

Another objective is to achieve the 5G performance requirements i.e., Knowledge performance indicators (KPIs) for tactile applications using 5G wireless communications.

It is to be understood that the aspects and embodiments of the disclosure described below may be used in any combination with each other. Several of the aspects and embodiments may be combined together to form a further embodiment of the disclosure.

BRIEF DESCRIPTION OF THE DRAWINGS

The embodiments of the disclosure are illustrated in the accompanying drawings, throughout which lie reference letters indicate corresponding parts in the various figures. The embodiments herein will be better understood from the following description with reference to the drawings, in which:

FIG. 3 illustrates a flowchart for a method of facilitating multi-level stream-based edge analytics in multi-modal communication, according to an embodiment of the present invention.

Figure 1:
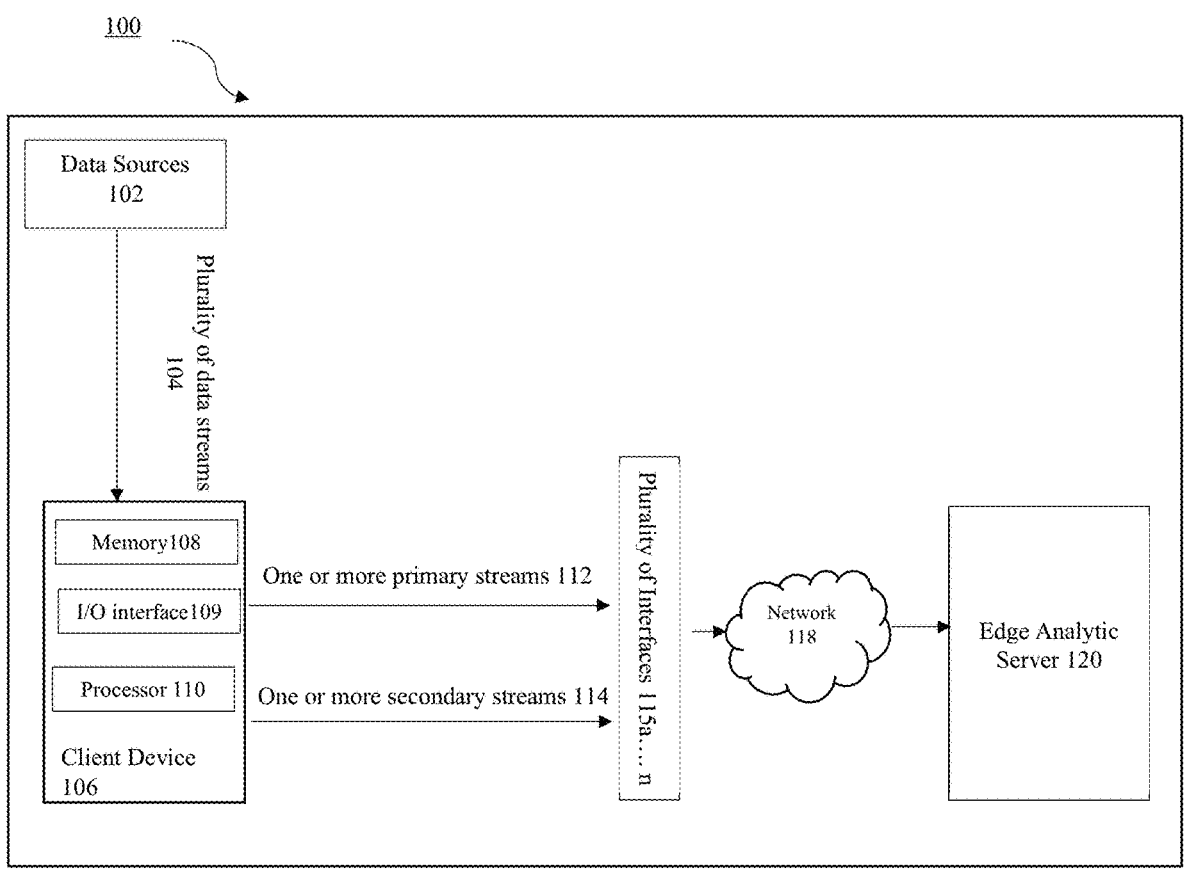
FIG. 1 illustrates a block diagram for a system for facilitating multi-level stream-based edge analytics in multi-modal communication, according to an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the scope of the disclosure.

The terms "comprises", "comprising", "include(s)", or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus or device proceeded by "comprises . . . a" does not, without more constraints, preclude the existence of other elements or additional elements in the system or apparatus or device.

In the present disclosure, the terms like "edge intelligence" and "edge analytics" and "edge analysis" have been interchangeably used throughout the description. Further, the terms like "flow streams" or "data streams" or "packet streams" have been interchangeably used throughout the description. The terms like "service provider" or "service operators" or "network operators" have also been interchangeably used throughout the description. The terms like "client device" or "client apparatus" have also been interchangeably used throughout the description. The terms like "end-user application" or "multi-modal application" or "tactile application" have also been interchangeably used throughout the description.

The present disclosure facilitates multi-level stream-based edge analytics for providing effective multi-modal communication. The multi modal communication involves transmission of multi modal data over a network from at least one data source to an edge application. The edge application may be an end-user application deployed on an edge analytic server. Here, the end-user application can be a multi-modal application or a tactile application. The multi modal data may be transmitted in the form of bitstreams or packets. The data may also be in the form of audio or video data streams, which may be captured by video cameras and microphones or in form of bitstreams, which may be captured by sensors such as temperature sensor, speed sensor, etc.

In the present day, the volume of data being transmitted has grown substantially, resulting in network congestion and subsequent communication delays. Further, in edge computing scenario, the data is usually transmitted to edge applications running on the edge servers for processing. Due to remote separation of the data source from the edge servers, the latency of the end-user application is greatly affected. The edge server performs further analysis and data processing on the received data to obtain trends and vital information which is crucial for the end-user application. There are several use-cases that extensively utilize edge computing technologies, such as self-driving cars, remote surveillance, Internet of Things (IoT) device data analytics, video encoding and analytics, location aware services, device sensing in Smart Cities, autonomous robots, smart equipment, point of sales (POS) system etc.

Despite the advancements in communication technologies that facilitate faster and seamless data transmission through higher data transmission rates, it is important to note that these technologies often have stringent requirements that must be met. For instance, as a requirement of 5G communication, 5G core network must support various types of services such as Enhanced Mobile Broadband (eMBB), Ultra Reliable Low Latency Communications (uRLLC), and Massive Machine Type Communications (mMTC). Each of these terminals/services have different requirements for the core network. For example, the eMBB service may require a high data rate, and the uRLLC service may require high stability and low delay.

Table 1 defines the various key performance indicators (KPIs) for different use cases as defined under the 3GPP standard TS 22.261.

| | Characteristic parameter (KPI) | | | | | | | |
| Use Cases | Max allowed end-to-end latency | Service bit rate: user-experienced data rate | Reliability | Influence quantity | | | | Remarks |
| | | | | Message size (byte) | # of UEs | UE Speed | Service Area[21] | |
| --- | --- | --- | --- | --- | --- | --- | --- | --- |
| Remote control robot | 1-20 ms | 16 kbit/s –2 Mbit/s (without haptic compression encoding); 0.8-200 kbit/s (with haptic compression encoding) | 99.99% | 2-8/DoF | — | high-dynamic (≤50 km/h) | ≤1 km$^2$ | Haptic feedback |
| | 20-100 ms | 16 kbit/s –2 Mbit/s (without haptic compression encoding); 0.8-200 kbit/s (with haptic compression encoding) | 99.99% | 2-8/DoF | — | Stationary or Pedestrian | ≤1 km$^2$ | Haptic feedback |
| | 5 ms | 1-100 Mbit/s | 99.9% | 1500 | — | Stationary or Pedestrian | ≤1 km$^2$ | Video |
| | 5 ms | 5-512 kbit/s | 99.9% | 50-100 | — | Stationary or Pedestrian | ≤1 km$^2$ | Audio |
| | 5 ms | <1 Mbit/s | 99.999% | — | — | Stationary or Pedestrian | ≤1 km$^2$ | Sensor information |

Table 2 defines the various KPIs for various use cases defined under the Tactile Internet working group 1918.1.

amount of data transmitted over the network and also reduces the burden of processing on the edge server. In an

| Use Cases | Characteristic parameter (KPI) | | | | Influence quantity | |
|---|---|---|---|---|---|---|
| | Max allowed end-to-end latency | Service bit rate: user-experienced data rate | Reliability | # of UEs | Max allowed end-to-end latency | Service bit rate: user-experienced data rate |
| Gaming or Interactive Data Exchanging (note 3) | 10 ms (note 4) | 0, 1 to [1] Gbit/s supporting visual content (e.g. VR based or high definition video) with 4K, 8K resolution and up to120 frames per second content. | 99.99% (note 4) | ≤[10] | Stationary or Pedestrian | 20 m × 10 m; in one vehicle (up to 120 km/h) and in one train (up to 500 km/h) |
| Gaming or Interactive Data Exchanging (note 3) | 10 ms (note 4) | 0, 1 to [1] Gbit/s supporting visual content (e.g. VR based or high definition video) with 4K, 8K resolution and up to120 frames per second content. | 99.99% (note 4) | ≤[10] | Stationary or Pedestrian | 20 m × 10 m; in one vehicle (up to 120 km/h) and in one train (up to 500 km/h) |

NOTE 1:
Unless otherwise specified, all communication via a wireless link is between UEs and network nodes (UE to network node and/or network node to UE) rather than direct wireless links (UE to UE).
NOTE 2:
Length × width (×height).
NOTE 3:
Communication includes direct wireless links (UE to UE).
NOTE 4:
Latency and reliability KPIs can vary based on specific use case/architecture, e.g., edge/split rendering, and may be represented by a range of values.
NOTE 5:
The decoding capability in the VR headset and the encoding/decoding complexity/time of the stream will set the required bit rate and latency over the direct wireless link between the tethered VR headset and its connected UE, bit rate from 100 Mbit/s to [10] Gbit/s and latency from 5 ms to 10 ms.
NOTE 6:
The performance requirement is valid for the direct wireless link between the tethered VR headset and its connected UE.

To meet the above technology standards, it may be desirable to transmit only essential data that is sufficient for analysis at the edge application. This essential data can be a subset of the data that is collected from the various data sources. Further, by transmitting a subset of data, the network is optimally utilized while also ensuring that the above performance requirements are adequately met.

In this disclosure, a client device positioned in closer proximity to the data sources is disclosed. The client device may be in the form of a tactile support engine. Here, the client device pre-processes the data streams received from various data sources and determines a subset of data streams to be transmitted to an edge server. The subset of data streams are determined such that the edge server may acquire vital information that is sufficient for edge intelligence by analyzing the received subset of data streams. By determining the subset of data streams which is sufficient for the edge intelligence, the tactile support engine limits the embodiment, the vital information may be further transmitted to a cloud server for storage or other purposes.

Referring now to FIG. 1, which illustrates a block diagram of a system 100 for facilitating multi-level stream-based edge analytics in multi-modal communication, according to an embodiment of the present disclosure. The multi-level stream-based edge analytics system 100 comprises one or more data sources 102, a client device 106, and an edge analytic server 120. The one or more data sources 102 comprises one or more of a camera, a microphone, a temperature sensor, and an actuator. An actuator not only gathers data but also performs action based on pre-defined instructions or control signals obtained from the edge analytic server 120. The client device 106 includes a memory 108, an I/O interface 109, and a processing unit 110, but not limited thereto. The processing unit 110 may comprise one or more processors, but not limited thereto. The processing unit, memory 108, and the I/O interface 109 are communicatively coupled with each via wired and/or wireless channel.

In an embodiment, the edge analytic server 120 generates and transmits control information after performing the edge analytics. The control information is generated in the form of control signals, actionable information or operation settings and/or control actions. The edge analytic server 120 then transmits the control information over the network to one or more remote devices. These remote devices are devices which may be part of the client device 106 or may be located in close proximity to the client device 106. The remote device performs operations based on the control information so received and may transfer feedback information to the client device 106.

In an embodiment, one or more data sources 102 may capture a plurality of data streams 104 related to application. The plurality of data streams 104 may be in the form of video data stream, audio data stream, and haptic data stream. The data streams 104 may also include time series data streams, time-stamped images, video streams, etc. The data streams 104 may also include video/audio media, sensor information (temperature, humidity, etc.), haptic data, tactile, and kinesthetic sensory details generated through one or more data sources 102. The processing unit 110 may receive the plurality of data streams 104 from the one or more data sources 102 via the I/O interface 109. The processing unit (110) may process the plurality of data streams 104 based on a type of end-user application running on the edge analytic server 120. Based on the processing, a primary data stream 112 and a secondary data stream 114 is generated. The primary data stream 112 is sufficient to perform the edge analytics at the edge analytic server 120. The secondary data stream 114 provides additional information to enhance the edge analytics at the edge analytic server 120.

In another embodiment, the primary data stream 112 comprises one or more of: low-resolution video data stream, medium resolution video data stream, high-resolution video data stream, low sample rate audio data stream, medium sample audio data stream, high sample rate audio data stream, and haptic data stream.

In one of the embodiments, the primary data stream 112 and secondary data stream 114 are generated based on input requirements fetched from the edge analytic server 120. For example, the input requirement may be direct instructions to include only a particular modality of data stream as the primary stream, i.e., input signal to send only audio data stream as a primary data stream.

Further, the processing unit may determine bandwidth required for transmission of the primary data stream 112 and the secondary data stream 114. The processing unit 110 may select one or more network interfaces 115a . . . c from the plurality of network interfaces 115a . . . n for transmission of the primary and secondary data streams. The processing unit may select one or more network interfaces 115a . . . c based on traffic characteristics of the network interfaces 115a . . . n and the determined bandwidth requirements. The processing unit may transmit the primary data stream 112 to the edge analytic server 120 through the selected one or more network interfaces 115a . . . c, wherein the edge analytic server 120 performs the edge intelligence based on the primary data streams 112. In another embodiment, the secondary data stream 114 may also be transmitted to the edge analytic server 120, which provides additional information which may add-on to perform the edge intelligence.

In another embodiment, the primary stream 112 may be divided and sent through multiple interfaces 115a . . . c and is later aggregated at the edge analytic server 120, thereby ensuring data reliability at the edge analytic server 120. In another embodiment, the primary stream may be duplicated and sent over multiple interfaces thereby achieving high availability and in case transmission failures.

In another embodiment, the secondary data stream 114 may be sent over network 118 without meeting the latency requirement. Here, the secondary stream 114 just ensures timely delivery of data in case the primary stream could not reach in time or in case of failures.

In this manner, the proposed system utilizes multi-level encoding of data streams to ensure high availability and to achieve stringent latency requirements of a multi-modal communication. The proposed system limits the amount of data being transmitted to the edge analytic server 120 by transmitting a subset of data streams sufficient enough for edge analytics. This reduces the network overhead and is also beneficial in improving network performance by efficiently utilizing the vital network resources. Thus, by reducing the actionable information sent to the edge analytic server 120, an efficient analysis may be performed.

In another embodiment, the edge analytic server 120 may provide feedback to control the remote device by performing the edge analytics based on the primary stream and/or the secondary stream. Here the remote device is located in close proximity to the client device 106. For instance, in a remote robot control system, the robot is a remote device that performs operations based on the instructions provided by the edge analytic server 120. Here, the edge server 120 acts as a controller and generates and transmits control signals and/or instructions for the remote device.

In another embodiment, the edge analytic server 120 analyzes the primary data stream 112 to generate vital trends for reports and detects run-time system anomalies.

In one of the embodiments, the primary 112 and the secondary data streams 114 may be transmitted through the network interfaces 115a . . . n and aggregated at the edge analytic server 120.

In another embodiment, the client device 106 and the edge analytic server 120 communicate over the network. The network can be composed of multiple PLMNs (Public Land Mobile Networks), wherein each PLMN is being operated by a different network operator than the other. For example, the edge analytic server 120 may be associated with a radio access network that is part of a first public land mobile network (PLMN) (i.e., associated with a first mobile services provider or operator). Further, the client device 106 may be associated with a second public land mobile network (PLMN) (i.e., associated with a second mobile services provider or operator). However, while transmission, both these first and second PLMNs can be utilized to ensure efficient communication through reduced latency, high availability and timely delivery.

In one of the embodiments, the present disclosure enables the transmission of the primary and secondary streams 112, 114 via a multi-operator network. The multi-operator network deployed for the multi-modal communication can be network 118 composed of multiple PLMNs (Public Land Mobile Networks). These multiple PLMNs may be associated with one or more edge devices and servers. The use of multiple PLMNs guarantees timely delivery even in case of varying traffic bursts.

In another embodiment, each primary or secondary stream is directed to a specific interface of the multi-PLMN network. This selection of specific interface may be based on the standards and requirements of network 118.

In another embodiment, the client device 106 may include a network interface configured to couple to a network, a plurality of input/output (I/O) ports configured to couple to a respective plurality of devices such as modems, the processing unit 110 coupled to the network interface and to the plurality of I/O ports.

In another embodiment, the network interfaces connect to multiple modems (via USB dongle) belonging to different mobile networks (such as Airtel, Jio, VI, etc.,). The latency (round-trip time in milliseconds) of a particular interface is determined by measuring the time it takes for the edge analytic server 120 to reply through the modem connected to the particular interface. The Uplink speed of the particular interface is calculated by sending a small chunk of the data. The data is sent to the particular interface by considering the three tuples (IP address, port number, and the protocol used for communication) of the USB dongle. The protocols can be Transmission Control Protocol (TCP) or a User Datagram Protocol (UDP).

In another embodiment, by using multiple PLMNs system, the transmission bandwidth that supports the transmission of the primary stream for the edge analytics at the edge analytic server 120 can be aggregated, thereby enhancing the transmission bandwidth. In another embodiment, the interface 115a . . . c of a network, selected for transfer of primary stream 112 may require a high bandwidth. That is the selected network interface is one of Enhanced Mobile Broadband (eMBB) service category. In such cases, the primary stream can be transmitted on the particular network interface.

In another embodiment, the type of the end-user application can be remote care, remote detonation, remote operation, remote maintenance, and remote firefighting, but not limited thereto. Furthermore, end-user application may also be applicable for controlling remote avatars in meetings, discussions, seminars or conferences to facilitate smooth interaction. Further, in one such embodiment, the edge analytic server 120 may generate control action such as initiating a call to emergency services, such as a fire department, in response to edge analytics being performed on the primary stream 112 and/or secondary data stream 114.

Figure 2:
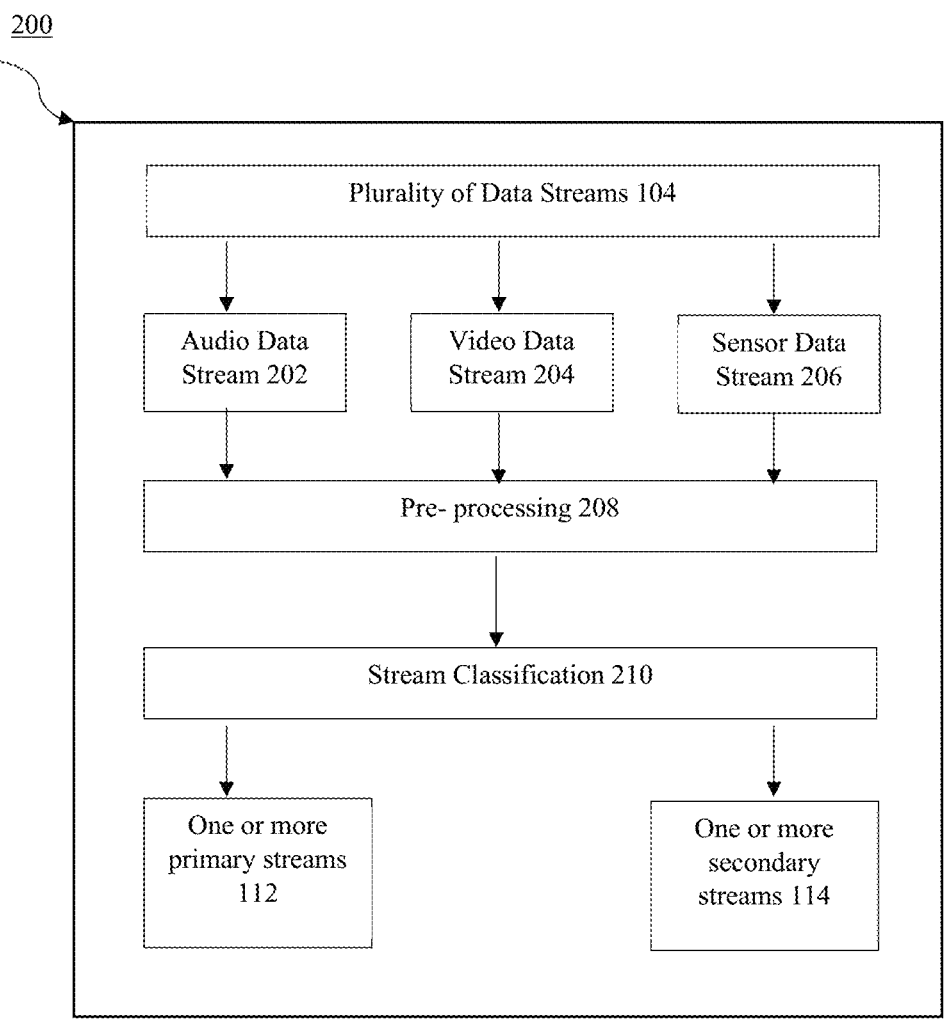
FIG. 2 illustrates a block diagram for the client device for facilitating multi-level stream-based edge analytics in multi-modal communication, according to an exemplary embodiment of the present disclosure.

FIG. 2 illustrates a block diagram for the client device 106 for facilitating multi-level stream-based edge analytics in multi-modal communication, according to an exemplary embodiment of the present disclosure.

As illustrated herein, the classification of the data streams 104 into a primary 112 and a secondary stream 114 is a unique functionality of the present disclosure. Before performing classification process 210, the plurality of data streams 104 may be pre-processed. The pre-processing operation of a particular data stream depends on the modality of that particular data stream. For example, for an audio data stream 204 a sampling operation may be performed to obtain multiple sets of audio stream such as a low sampled audio stream, a medium sampled audio stream and a high sampled audio stream but not limited thereto. Further, the pre-processed streams are combined, arranged and classified into a single stream, such as a primary stream or a secondary stream. While combining the pre-processed data streams, the data streams 104 can be synchronized according to various parameters such as time or frequency.

In one of the embodiments, the multiple pre-processed streams may be transmitted through multiple interfaces and aggregated at the edge analytic server 120 for analysis.

FIG. 3 illustrates a flowchart for a method of facilitating multi-level stream-based edge analytics in multi-modal communication, according to an embodiment of the present invention.

In another embodiment, method 300 of facilitating multi-level stream-based edge analytics in multi-modal communication is disclosed.

At block 302 of the method 300, the data streams 104 retrieved from one or more data sources 102 are received. These data streams 104 are collected from various data sources 102. These data sources 102 can be video cameras, microphones, sensors such as temperature sensors, motion sensors, light sensors etc. Data from all these data sources 102 may be retrieved in the form of bitstreams. If the data is not received in bit stream format, appropriate conversion process may be performed. Further, one or more data streams may also be combined based on predefined instructions. Upon conversion and combination of data streams, the resultant data stream is received by the client device 106.

At block 304 of method 300, the primary data stream 112 and secondary data stream 114 are generated based on processed data streams. The processing of data streams 104 are based on type of the multimodal or the end-user application. Herein the primary data stream 112 is sufficient to perform the edge analytics at an edge analytic server 120 and the secondary data stream 114 provides additional information to enhance the edge analytics at the edge analytic server 120. For instance, if the application is for facilitating remote elderly care, then the requirement of the application is a high-quality video data stream is a must to analyze status of elderly. Further, other smart devices must be controlled to assist the elderly based on the analysis performed. Thus, such an application requires a high-quality video stream as a primary data stream 112.

For instance, if the input stream is a video stream, then the primary stream may be a down-scaled version of the input stream. This conversion of the input video stream into a low-resolution primary stream can be obtained by using a data processing tool such as a ffmpeg tool, present on client device 106. In one of the embodiments, the secondary stream being an add-on stream may be an upscaled or high-resolution version of the input stream. These streams may be sent iteratively and later aggregated at the edge analytic server 120.

At block 306, bandwidth requirements are determined to enable fast and efficient transmission of the determined primary stream 112. For instance, if a high-quality video stream must be transmitted then an interface that satisfy the bandwidth requirements of high-quality video stream must be chosen as the selected network interface. Once latency and bandwidth requirement for a particular stream is determined (for example, 480p video stream requires ~5 Mbps bandwidth), the interface that fulfils this requirement is then selected. At block 308, one or more such network interfaces 115a . . . c from the network interfaces 115a . . . n must be selected based on traffic characteristics of the network interfaces 115a . . . n and the bandwidth requirements.

Lastly at block 310, the primary data stream 112 is transmitted to the edge analytic server 120 for the edge analytics via the selected one or more network interfaces. Further, the secondary data stream 114 may also be later transmitted to the edge analytic server 120 for advance edge analytics. These primary 112 and secondary data streams 114 may be aggregated at the edge analytic server 120, before the analysis of the streams.

In one of the embodiments, the primary stream and the secondary stream are based at least in part on an application requirement, wherein the application requirement comprise at least one of a bandwidth requirement, a video resolution/quality requirement, or an audio frequency requirement. In one of the embodiments, the application requirement may provide an indication such that the primary stream must be sufficient enough to perform edge analytics. This indication can be a level of quality and/or any other parameters corresponding to the primary data stream 112. In another embodiment, the stream which is received earliest can also be selected as a primary stream. For example, if the application requirement is such that the application does not require a video data stream, based on any previous analysis performed by the edge analytic server 120. In such a case, an indication may be sent from the edge analytic server 120 to the client device 106 to only send audio data stream as a primary stream. This may result in a reduction in the amount of data being transmitted, thereby utilizing network resources efficiently. This may be applicable for any given stream such as video, audio and textual data stream.

Figure 4:
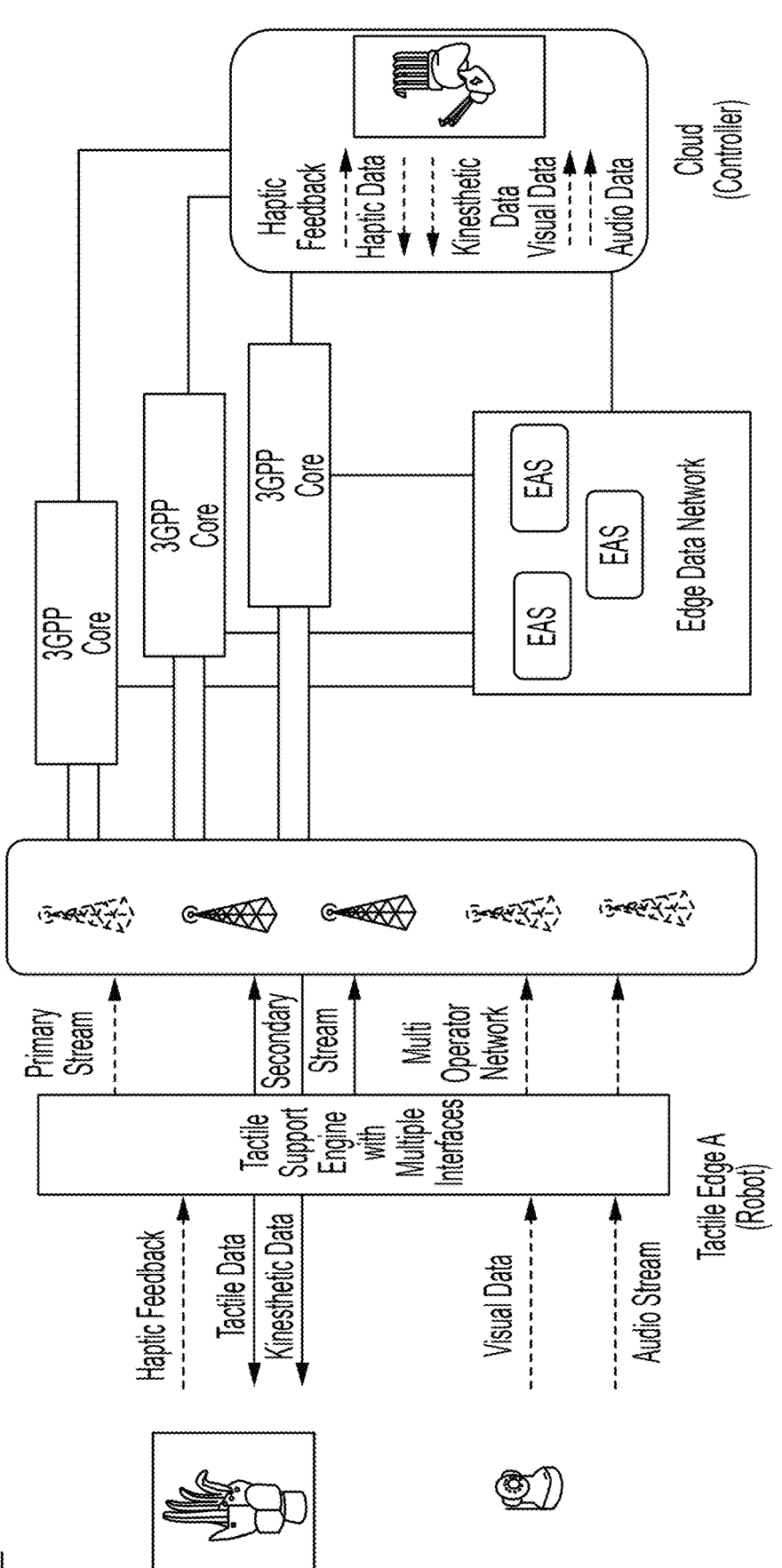
FIG. 4 illustrates a block diagram for a remote robot control system employing multi-level stream-based edge analytics, according to an embodiment of the present invention.

The functionality of the above-mentioned system may be easily understood by the following example illustrated in FIG. 4. FIG. 4 illustrates a block diagram for a remote robot control system employing multi-level stream-based edge analytics, according to an embodiment of the present invention.

As illustrated, the system comprises a remote-control robot and a physically separated master at a distance, which communicates over a 5G network. The remote-control robot such as a robotic hand may comprise one or more sensors or actuators. The master or the controller may be a human agent that receives haptic feedback, video, and audio data from the robot. The human agent may perform reactions suitable for a situation and generate actionable information. For example, this actionable information may be tactile and kinesthetic sensory information generated by a haptic glove worn by the human agent. The remote-control robot performs the master's actions based on the actionable information received. The input stream from the remote-control robot can contain various types of data such as audio data, video data, tactile data and kinesthetic data. The audio data may be the audio feed recorded by a microphone near or around the remote-control robot. The video data may be the video feed captured from a camera installed near the remote-control robot to trace its movements. Further, tactile data may be sensor data acquired from the sensors installed on the remote-control robot to gather information regarding the surface material such as roughness, stiffness, friction and thermal conductivity of the surface the remote-control robot is in contact with. The kinesthetics data may be the movement data relating to force, motion, velocity and rotation of the remote-control robot. The tactile support engine as illustrated in FIG. 4 selects a primary stream among the plurality of data streams 104 that will be transmitted to the edge analytic server 120. The server then processes the primary stream to generate actionable information. This actionable information can again be feedback to the client device 106 to form a feedback control loop system.

Furthermore, the remote robot control system may also perform skill sharing via remote locations with real-time and synchronous visual, audio, and haptic feedback. The multimodal information from the robot hand may be sent to the edge analytic server 120 through multiple PLMNs. Further, at the edge analytic server 120, an initial analysis of the primary stream is performed. For example, an analysis of the video stream of 480 pixels is performed to determine information regarding whether the remote-control robot is moving or not and the determined information is transmitted for further processing. Yet another form of initial analysis of the primary stream can be estimation from video stream of 1280 pixel, a pre-determined pose/posture of an object. Further, control information is generated at the edge analytic server 120 based on the initial analysis at the server, i.e., for example motion information or pose information can be identified as control information and may be sent to the remote-control robot in the form of control signals. For example, for an application, where the requirement is to determine the movement of the remote robot, a 480p stream can be classified as the primary stream while 1280p resolution stream and kinesthetic data stream can be classified as secondary stream. This is because a 480p stream is sufficient for the edge application to detect whether the robot is moving. The secondary streams may be add-on to the primary streams.

Figure 5:
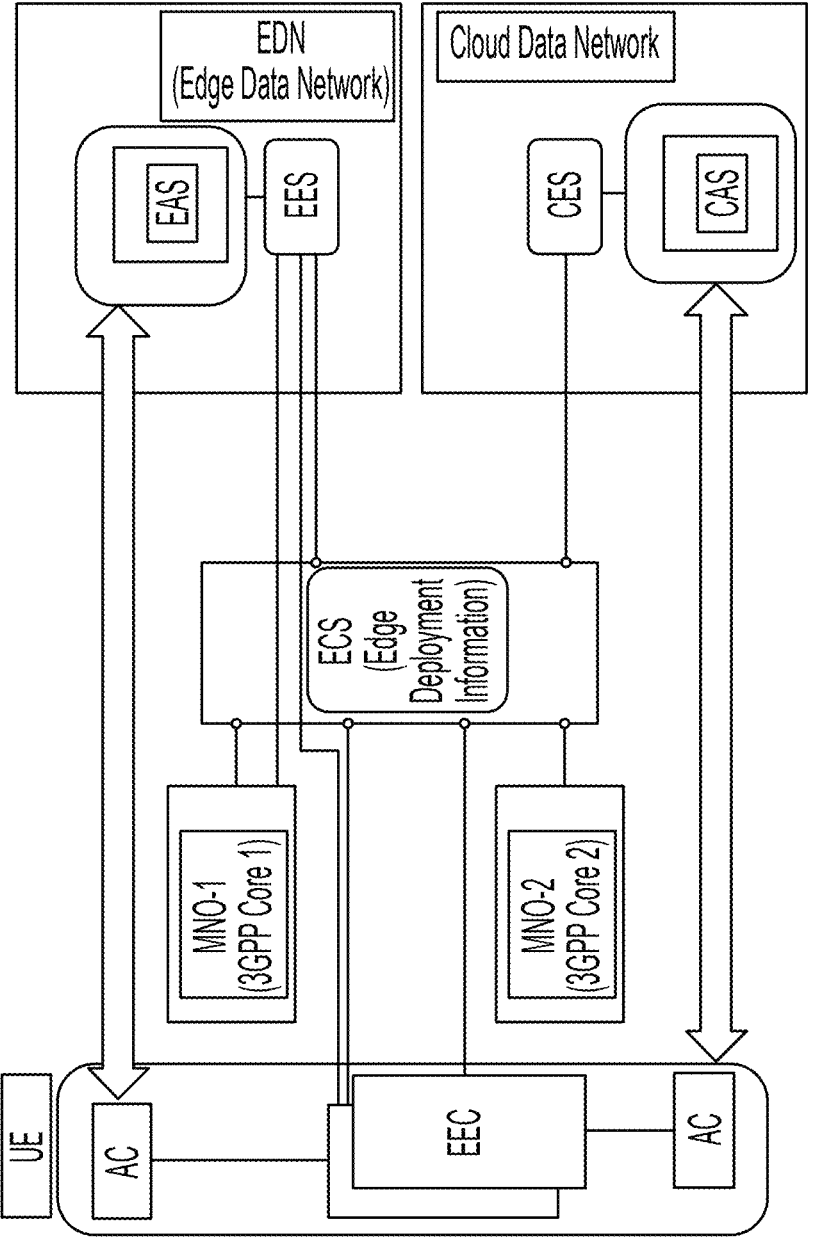
FIG. 5 illustrates a block diagram for a 3GPP application enablement architecture employing multi-level stream-based edge analytics, according to an embodiment of the present invention.

FIG. 5 illustrates a block diagram for a 3GPP application enablement architecture employing multi-level stream-based edge analytics, according to an embodiment of the present invention.

In one of the embodiments, client device 106 of FIG. 1 may be part of a user equipment/device that may include at least one Application Client (AC) and an Edge Enabler Client (EEC) corresponding to the application clients. User device can also be a mobile device that utilizes services offered by a service provider. The exchange of data and services between the service provider and the mobile device are routed through a mobile network. The AC connects to EEC to identify if an edge computing service is available and requests a connection to Edge Application Server (EAS). The EEC may be a software module having authentication functions for accessing the EAS. In particular, the EEC controls the user device to transmit an initial provisioning request message to the ECS and controls the user device to receive an initial provisioning response message including information on the edge data network from the ECS.

Further, the EEC interacts with an Edge Configuration Server (ECS), which contains information about the services offered by the Edge Computing Service Provider (ECSP). The EEC may have a pre-configured address of the ECS or can receive it through Application Function in 5G Core. The ECS is a server that receives configuration information to use an edge computing service and provides this configuration information on an edge data network to the AC via the EEC.

In the present disclosure, the Edge computing infrastructure is integrated with the 5G core of a PLMN that contains an Edge Data Network (EDN) which has the Edge Enabler Server (EES). The EES contains and instantiates Edge Application Server (EAS) on which the edge application is executed. The edge application may be a server program executed on the server. The edge application receives one or more primary streams from the user device. The edge application performs further analysis on the received data streams. Edge Enabler Server is a server for providing edge computing services, providing configuration information for list of applications running on the EAS. The EES also provides APIs for functions provided by the 3GPP network to edge applications. The EAS and the edge analytic server 120 of FIG. 1 perform the same function. Further, a Cloud Application Server (CAS) may also be present that is required for storage or further analysis. Here EAS and the CAS may be computing system, such as a server, a cluster of servers, a storage system or the like.

In one or more embodiments, the present disclosure is applicable to systems for remote elderly care, remote bomb detonation, remote maintenance of a facility, remote firefighting, etc. For example, the EAC device can be configured to enable detection and diagnosis of faults in equipment, automatically respond to occupant hot/cold calls by adjusting one or more parameters of associated devices, such as a number of terminal devices on a floor of a building, such as thermostats, optical sensors, lighting units, fans, water monitoring units, humidity sensors, other devices, or any combination thereof.

While considerable emphasis has been placed herein on the particular features of this disclosure, it will be appreciated that various modifications can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

Reference numerals used:

| | |
|---|---|
| 100 | System |
| 102 | Data Sources |
| 104 | Plurality of data streams |
| 106 | Client Device |
| 108 | Memory |
| 109 | I/O interface |
| 112 | One or more primary streams |
| 114 | One or more secondary streams |
| 115a . . . n | Plurality of interfaces |
| 118 | Network |
| 120 | Edge Analytic Server/Device |
| 202 | Audio Data Stream |
| 204 | Video Data Stream |
| 206 | Sensor Data Stream |
| 208 | Pre-processing |
| 210 | Stream Classification |

We claim:

1. A device for facilitating multi-level stream-based edge analytics in multi-modal communication, comprising:

a memory;

an input/output (I/O) interface communicatively coupled with the memory; and a processing unit communicatively coupled with the memory and the I/O interface, the processing unit configured to:

receive a plurality of data streams related to a multimodal application from one or more data sources via the I/O interface;

generate at least one primary data stream and at least one secondary data stream by processing the received plurality of data streams based on type of the multimodal application and on input requirements received from an edge analytic server, wherein the primary data stream is sufficient to perform the edge analytics at the edge analytic server, wherein the secondary data stream provides additional information to enhance the edge analytics at the edge analytic server;

determine bandwidth requirements for transmission of each of the at least one primary data stream and at least one secondary data stream;

select one or more network interfaces from a plurality of network interfaces to transmit the at least one primary data stream based on traffic characteristics including at least latency and uplink speed of the plurality of network interfaces and the bandwidth requirements; and transmit the at least one primary data stream to the edge analytic server for the edge analytics via the selected one or more network interfaces and transmit the at least one secondary data stream to the edge analytic server for aggregation with the at least one primary data stream to perform advanced edge analytics, the secondary data stream being transmitted without meeting a latency requirement.

2. The device of claim 1, wherein the plurality of data streams comprises at least one of: video data stream, audio data stream, and haptic data stream.

3. The device of claim 1, wherein the one or more data sources comprises one or more of: at least one camera, at least one microphone, at least one temperature sensor, and at least one actuator.

4. The device of claim 1, wherein the type of the multimodal application comprises at least one of: remote care, remote detonation, remote operation, remote maintenance, and remote firefighting, wherein the at least one primary data stream and at least one secondary data stream are generated by processing the received plurality of data streams based on input requirements of the edge analytic server to perform the edge analytics based on the type of the multimodal application.

5. The device of claim 1, wherein the primary data stream comprises one or more of: low-resolution video data stream, medium resolution video data stream, high-resolution video data stream, low sample rate audio data stream, medium sample rate audio data stream, high sample rate audio data stream and haptic data stream.

6. A method of facilitating multi-level stream-based edge analytics in multi-modal communication, comprising:

receiving a plurality of data streams related to a multimodal application from one or more data sources;

generating at least one primary data stream and at least one secondary data stream by processing the received plurality of data streams based on a type of the multimodal application and on input requirements received from an edge analytic server, wherein the primary data stream is sufficient to perform the edge analytics at the edge analytic server, and wherein the secondary data stream provides additional information to enhance the edge analytics at the edge analytic server;

determining bandwidth requirements for transmission of each of the at least one primary data stream and at least one secondary data stream;

selecting one or more network interfaces from a plurality of network interfaces to transmit the at least one primary data stream based on traffic characteristics including at least latency and uplink speed of the plurality of network interfaces and the bandwidth requirements; and transmitting the at least one primary data stream to the edge analytic server for the edge analytics via the selected one or more network interfaces and transmitting the at least one secondary data stream to the edge analytic server for aggregation with the at least one primary data stream to perform advanced edge analytics, the secondary data stream being transmitted without meeting a latency requirement.

7. The method of claim 6, wherein the plurality of data streams comprises at least one of: video data stream, audio data stream, and haptic data stream.

8. The method of claim 6, wherein the type of the multimodal application comprises at least one of: remote care, remote detonation, remote operation, remote maintenance, and remote firefighting, wherein the at least one primary data stream and at least one secondary data stream are generated by processing the received plurality of data streams based on input requirements of the edge analytic server to perform the edge analytics based on the type of the multimodal application.

9. The method of claim 6, wherein the primary data stream comprises one or more of: low-resolution video data stream, medium resolution video data stream, high-resolution video data stream, low sample rate audio data stream, medium sample rate audio data stream, high sample rate audio data stream and a haptic data stream.

10. A system for multi-level stream-based edge analytics in multi-modal communication, comprises:

an edge analytic server; and a client device configured to communicate with the edge analytic server, via one or more network interfaces, wherein the client device comprises:

a memory;

an input/output (I/O) interface communicatively coupled with the memory; and a processing unit communicatively coupled with the memory and the I/O interface, the processing unit configured to:

receive a plurality of data streams related to a multimodal application from one or more data sources via the I/O interface;

generate at least one primary data stream and at least one secondary data stream by processing the received plurality of data streams based on a type of the multimodal application and on input requirements received from the edge analytic server, wherein the primary data stream is sufficient to perform the edge analytics at the edge analytic server, and wherein the secondary data stream provides additional information to enhance the edge analytics at the edge analytic server;

determine bandwidth requirements for transmission of each of the at least one primary data stream and at least one secondary data stream;

select one or more network interfaces from a plurality of network interfaces to transmit the at least one primary data stream based on traffic characteristics including at least latency and uplink speed of the plurality of network interfaces and the bandwidth requirements; and transmit the at least one primary data stream to the edge analytic server for the edge analytics via the selected one or more network interfaces, and transmit the at least one secondary data stream to the edge analytic server for aggregation with the at least one primary data stream to perform advanced edge analytics, the secondary data stream being transmitted without meeting a latency requirement, wherein the edge analytic server is configured to:

receive the at least one primary data stream from the client device; and perform the edge analytics on the received at least one primary data stream.

11. The system of claim 10, wherein the edge analytic server is configured to:

receive the at least one secondary data stream from the client device;

aggregate the at least one primary data stream and at least one secondary data stream; and perform advanced edge analytics on the aggregated data streams.

* * * * *